United States Patent [19]
Johnson

[11] 3,972,042
[45] July 27, 1976

[54] METAL TARGET DETECTION SYSTEM
[75] Inventor: Robert H. Johnson, Scottsdale, Ariz.
[73] Assignee: Motorola, Inc., Chicago, Ill.
[22] Filed: Dec. 2, 1974
[21] Appl. No.: 528,828

[52] U.S. Cl............................ 343/17.2 PC; 343/5 SA
[51] Int. Cl.² ........................................ G01S 9/233
[58] Field of Search ........ 343/17.2 PC, 5 PD, 5 SA, 343/5 R, 7 A, 17.5, 18 B, 17.1 R

[56] References Cited
UNITED STATES PATENTS

| | | | |
|---|---|---|---|
| 3,263,227 | 7/1966 | Ferry et al. | 343/17.2 PC |
| 3,714,653 | 1/1973 | Thor et al. | 343/17.2 PC |
| 3,732,567 | 5/1973 | Low et al. | 343/17.5 X |
| 3,798,642 | 3/1974 | Augenblick et al. | 343/7 ED |
| R28,302 | 1/1975 | Staras et al. | 343/5 R |

Primary Examiner—Malcolm F. Hubler
Attorney, Agent, or Firm—Sang Ki Lee; Vincent J. Rauner; M. David Shapiro

[57] ABSTRACT

A system for differentiating between targets containing non-linear metal element junctions and their surrounding non-metallic environment. A spread spectrum illuminating transmitter is used in conjunction with correlation circuits in a receiver to enhance its signal to interference ratio and reduce required peak power level in the illuminator/transmitter.

8 Claims, 3 Drawing Figures

FIG. I

METAL TARGET DETECTION SYSTEM

FIELD OF THE INVENTION

This invention relates in general to a detection system for a metallic target and, in particular, to an improvement of such a system to utilize spread spectrum techniques for enhancement of the detection function.

BACKGROUND OF THE INVENTION

The phenomenon of virtual diodes occuring at metallic junctions has been known for several decades. This characteristic of metallic junctions has been utilized in an effort to electronically differentiate metallic targets from nonmetallic surroundings since the mid 1960's with varying degrees of success. The detection range for a given power in the illuminating signal has been somewhat limited. The relatively low receiver signal levels make existing systems especially susceptable to jamming or other interfering signals. In prior systems an attempt was made to use high metallic junctions in the target to saturate or become inoperative. To overcome these shortcomings, in some system environments where the target was already of such character that it could cooperate with the balance of the system, higher efficiency non-linear elements were purposely located on the target. This is seldom practical, however, in non-cooperative target environments.

SUMMARY OF THE INVENTION

The foregoing and other problems are alleviated, in accordance with the present invention, by utilizing spread spectrum signal sources combined with compression techniques in the detector of the receiver.

According to one aspect of the invention, an improved modulation method is used to provide spread spectrum modulation of the illuminating signal allowing transmission of lower peak power levels from the illuminator.

According to another aspect of the invention, correlation technique is used to compress the received signal to improve the signal to interference ratio in the receiver detector output without the necessity of resorting to use of a transmitter that generates high power signal.

The foregoing and other aspects of the present invention will be understood more fully from the following detailed description of an illustrative embodiment of the present invention in conjunction with the accompanying drawings.

DETAILED DESCRIPTION OF THE DRAWINGS

DETAILED DESCRIPTION OF THE INVENTION

Figure 1:
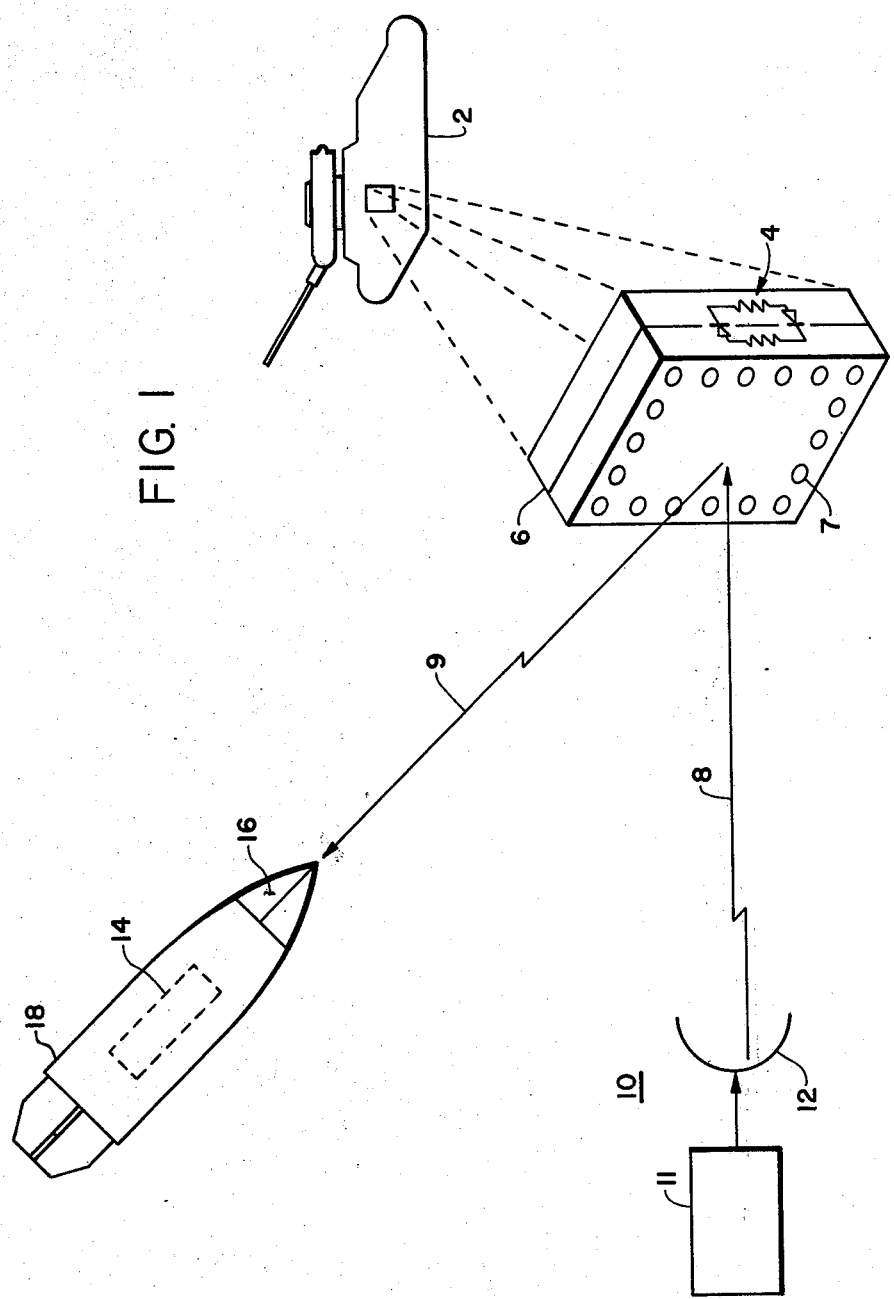
FIG. 1 is a general view of the system of the invention.

A preferred embodiment of the invention is depicted in FIG. 1. Radiating system 10 consisting of a transmitter 11 and antenna 12 is located so that it can illuminate target 2 having fabricated metal construction typified by a conceptual segment shown in an enlarged form 6 in FIG. 1. What is shown in conceptual segment 6 is typical of targets of interest. At least two pieces of metal are shown fastened together by rivets bolts or the like 7. Because of the imperfections of design, construction and assembly, a small gap exists between the two pieces of fastened metal. This gap may be thought of as the equivalent diode-resistor network 4, as schematically illustrated. The gap invariably causes the segment 6 to have the non-linear characteristics of equivalent network 4, as shown.

Because of the non-linear electrical characteristics of the segment, when illuminated by a fixed single frequency from radiating system 10, it will radiate a signal 9 that tends to have a strong odd harmonic components. It is found that generally the strongest of these odd harmonic components is the third harmonic component appearing at a frequency three times that of the frequency radiated by radiating system 10. However, even though the third harmonic component is the strongest of the harmonics reradiated 9 the absolute power level reradiated at three times the illuminating frequency is only marginally useful for the guidance purpose of the invention. The signal power levels available from reradiated signal 9 to vehicle 18 of FIG. 1 are usually very low and of limited use. It is as important to the understanding of the invention then, to consider the manner in which radiating system 10 and receiving system 14 treat the signals to improve the usefulness of them in the desired guidance function.

First, the radiating system 10 is physically separated from the receiving system 14 as much as possible so that the self generated noise in the radiating part of the system 10 will not overload the receiving system 14. This improves the effective range of the system. However, even with this improvement, the system has limited range capabilities unless impractically high levels of power are radiated from radiating system 10. It has been found that when abnormally high power levels impinge on target 2, gap or junction equivalent network 4 saturates and becomes even less efficient in reradiating. This is not desirable since little harmonics are radiated and it is no longer possible to readily differentiate fabricated metal targets from the surrounding environment except by the amplitude of the radiated signal 9. Since it is relatively easy to recognize and separate the third harmonic signal from fabricated metal target 2 from the fundamental signal frequencies from surrounding targets, it is desirable to maintain the non-linear nature of the gaps 4 in fabricated metal target 2. It follows that it is undesirable to use the extremely high power levels which cause this problem.

Figure 2:
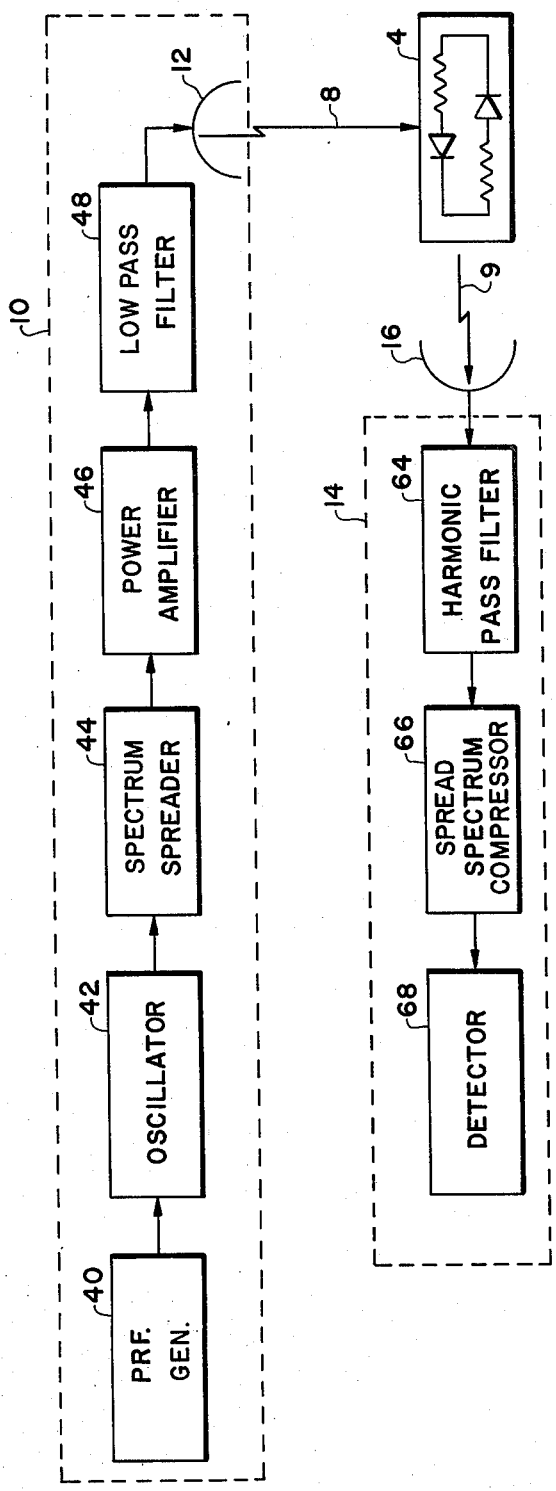
FIG. 2 is a functional block diagram of the preferred embodiment of the system of the invention shown in FIG. 1.
Figure 3:
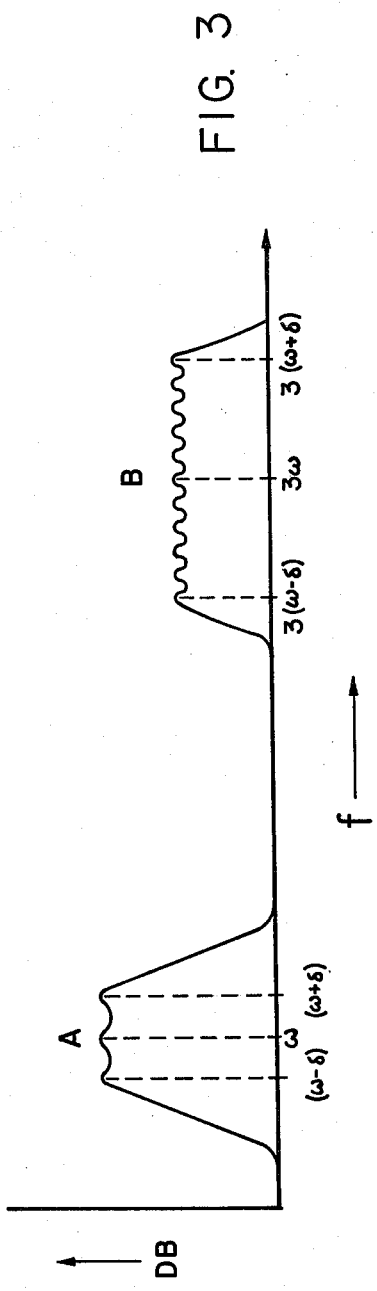
FIG. 3 illustrates the spectral characteristics of the signals of the system of FIG. 2.

In the present invention, lower power levels are used, but they are radiated in a spread spectrum as shown in FIG. 2. Pulse repetition frequency (PRF) generator 40 is used to modulate oscillator 42. This modulation can be of the "chirp" type which is well known in the radar art. Oscillator 42 is turned on for the duration of each pulse from PRF generator 40 and the frequency of the oscillator varies in a linear and predictable way during the relatively short turn on time. The spectrum of oscillator 42 output is shown in FIG. 3 at A. This wide band signal is applied to the input terminal of spectrum spreader 44 of FIG. 2. Spectrum spreader 44 may be a surface wave filter which characteristically yields a time delay as a function of the applied signal frequency. In the present invention, the effect is to expand the width of the output pulse over time by possibly a ratio of 1000:1. Therefore, the resulting signal has a relatively low instantaneous power value, but it is radiated for a correspondingly long time period. This expanded signal is power amplified by power amplifier 46 and then passes through low pass filter 48 to antenna 50. Low pass filter 48 restricts the transmitted signals to a band of frequencies around the fundamental frequency of transmission ω. The amplified expanded signal is then transmitted via antenna 12 and path 8 to illuminate target 2. The signal 9 reradiated by target 2 will have a strong third harmonic component as illustrated by B of FIG. 3.

Referring again to FIG. 2, it will be seen that signal 9 is reradiated to antenna 16 connected to receiver 14. The signal from antenna 16 is applied to third harmonic bandpass filter 64, part of receiver 14, which rejects frequency components outside of the desired band and particularly, the fundamental frequency of frequency transmitter 10, thereby making receiver 14 insensitive to fundamental frequency reradiated signals from non-metallic targets. However, the signal is still expanded in time and has very low peak power. The signal is then passed to the input of spectrum compressor 66 which may be another surface wave filter. This filter is designed to have the inverse delay versus frequency characteristics of spectrum expander 44 in transmitter 10. The output of spectrum compressor 66 will correlate the signal time wise by compressing it by a high ratio, for example, of 1000:1. The result of this time compression is to provide an output pulse of short duration and very high relative amplitude to detection circuits 68.

Detection circuit 68 provides guidance signals to vehicle 18 for providing guidance to target 2.

In operation, radiation system 10, FIG. 1, is oriented to illuminate target 2 from a remote location. The spread spectrum transmitted signal 8 from radiation system 10 illuminates target 2 with a signal which has a bandwidth centered at ω, FIG. 3:A. Transmitted signal 8, FIG. 1, is radiated 9 by target 2 and the third harmonic component of transmitted signal 8 is generated by the non-linear electrical characteristics of target 2 as has been previously described. The spectrum of the reradiated signal is centered, therefore, at 3ω as is shown in FIG. 3:B. This frequency 3ω is easily discernable from the radiated signal of frequency ω. The reradiated third harmonic signal 9 having a frequency centered at 3ω is of a much lower power level than the radiated signal 8, however.

Vehicle 18 is released from an aircraft within range of target 2. Reradiated signal 9 is received by sensor antennas 16 on the nose of vehicle 18 in geometric quadrature. These received signals are then passed through band pass filter 64, FIG. 2, of receiver 14. Band pass filter 64 rejects all components of the received signal 9 except the 3ω component, and specifically, it rejects the ω component which will also be present as a composite reradiated signal, not only from target 2 but from the environment surrounding target 2, as well. The output signal from band pass filter 64 is passed to spread spectrum compressor 66. It will be apparent to one skilled in the art that if the bandwidth of radiated signal 8 is plus or minus δ as shown in FIG. 3:A, then the bandwidth of reradiated signal 12 will be plus or minus 3δ as shown in FIG. 3:B. Spread spectrum compressor 66, FIG. 2, is used to compress or time correlate the spectrum of reradiated signal 9 to provide a narrow pulse signal centered at frequency 3ω and of much higher peak power level than that of the spread spectrum signal 9. Detector 68 is then used to recover guidance information from the processed signal in a manner which is well known in the art.

Various modifications and changes may be made to the present invention from the principles of the invention as described above without departing from the spirit and scope thereof, as encompassed in the accompanying claims.

What is claimed is:

1. A metal detection system comprising:
    means for radiating a spread spectrum signal to a metal target having a non-linear electrical response characteristic, said target radiating a harmonic signal in response to said spread spectrum signal;
    means for receiving the harmonic signal; and
    means for compressing and detecting the harmonic signal.

2. The system according to claim 1, wherein said radiating means comprises:
    means for generating a pulse train with a predetermined repetition rate;
    means for generating a carrier signal, said carrier signal being modulated on and off by said pulse train and said carrier signal frequency being changed linearly during said on periods;
    means for lengthening the pulse duration of said frequency modulated carrier signal as a function of said carrier signal frequency;
    means for filtering said lengthened and modulated carrier signal for limiting said signal to a given spectrum width; and
    antenna means for radiating said filtered, lengthened, and modulated carrier signal.

3. The system according to claim 2, wherein said compressing means includes spread spectrum compressing means.

4. The system according to claim 1, wherein said receiving means comprises:
    antenna means for receiving said radiated harmonic signal from said metal target; and
    means for filtering out transmitted signal from the receiving means.

5. The system according to claim 1, wherein said means for radiating spread spectrum signal includes means for expanding a frequency varying signal.

6. A system for guiding a mobile vehicle to a metallic target having a non-linear electrical response characteristic, comprising:
    transmitting means for generating and directing a spread spectrum signal to said target,
    said target radiating a harmonic signal having a harmonic component in response to said spread spectrum signal, and
    said vehicle having receiving means for receiving and compressing said target harmonic signal for detecting said target.

7. The guidance system according to claim 6, wherein said transmitting means includes:
    means for generating a train of pulses,
    means for spreading the modulated pulse train, filtering out higher end frequency of the modulated pulse train,
    means for applying said filtered and modulated pulse train to said target.

8. The guidance system according to claim 6 wherein said receiving means includes:
    means for detecting a harmonic signal from said metallic target,
    means for filtering out unwanted transmitted signal and saving the harmonic signal, and said means for compressing the harmonic signal to increase sensitivity of said receiving means.

* * * * *